United States Patent Office 3,355,764
Patented Dec. 5, 1967

3,355,764
INJECTION MOLDING APPARATUS
Richard L. Moyer, Windy Hills, Del., assignor to Hercules Incorporated, a corporation of Delaware
Filed July 8, 1965, Ser. No. 470,515
4 Claims. (Cl. 18—12)

ABSTRACT OF THE DISCLOSURE

This invention relates to a molding machine having a spiral extruder for feeding molten polymer into the axial bore of the stationary plate of the extruder and from which it is expelled by a ram arranged axially of the rotatable plate of the extruder, the ram being movable endwise into the axial bore of the stationary plate and having a screw on the leading end thereof, which screw acts to receive the molten polymer from the spiral extruder when the ram is advanced and thereby seals the exit of the extruder and from which screw the molten polymer is ejected by the relative motion between the stationary screw and the surrounding portion of the rotatable plate. This apparatus is especially adapted for injection molding.

---

This invention relates to injection molding apparatus.

Injection molding is a well-known technique for fabricating shaped items from thermoplastic materials. In this process, molten thermoplastic material is forced, under pressure, into a closed mold where it is permitted to cool to a shape-retentive state before being removed therefrom. The technique is used for forming a great number of shaped articles, particularly items having odd or unusual shapes. The process is economically very attractive in that it results in very small quantities of scrap material and it can be operated at relatively high rates with a minimum of manual handling operations.

In its simplest form, the apparatus employed in injection molding comprises a heating cylinder wherein the thermoplastic material can be melted or plasticized and an injection piston or ram which forces the plasticized material through a nozzle into a cool shaping mold. The granular plastic is usually fed to the heating cylinder from a hopper or the like by gravity or by means of a feed screw and melts as it moves along the heating cylinder under the impetus of the injection ram. Controls and drive means are provided to reciprocate the injection ram and to synchronize its operation with that of the feed screw, if the latter is used.

The injection molding apparatus currently known are for the most part expensive pieces of equipment. This is due in part to their relatively great size since the injection and heating cylinder must be quite long in order to permit sufficient contact between the polymer and the heating surface to effectively melt the polymer and bring it to a substantially uniform temperature. These designs are also quite complicated due to the fact that, in order to impart the desired uniformity of temperature to the molten polymer, it is frequently necessary to place a partial obstruction known as a "torpedo" in the cylinder. This "torpedo" serves to spread the advancing molten polymer into a relatively thin layer along the heated wall of the cylinder during a portion of its flow to the mold. The size and complexity of these machines results in considerable expediture for equipment as well as in floor space for their installation.

In accordance with the instant invention, an improved injection molding machine is provided which possesses performance capabilities similar to those of the known injection molding machines, but due to its shape and to the geometric arrangement of its component parts it is considerably less complex in construction and occupies less floor space than is required for a conventional injection molding machine. Thus, it is less expensive to build and install. In addition, it is easier to maintain than its conventional counterparts.

Figure 1:
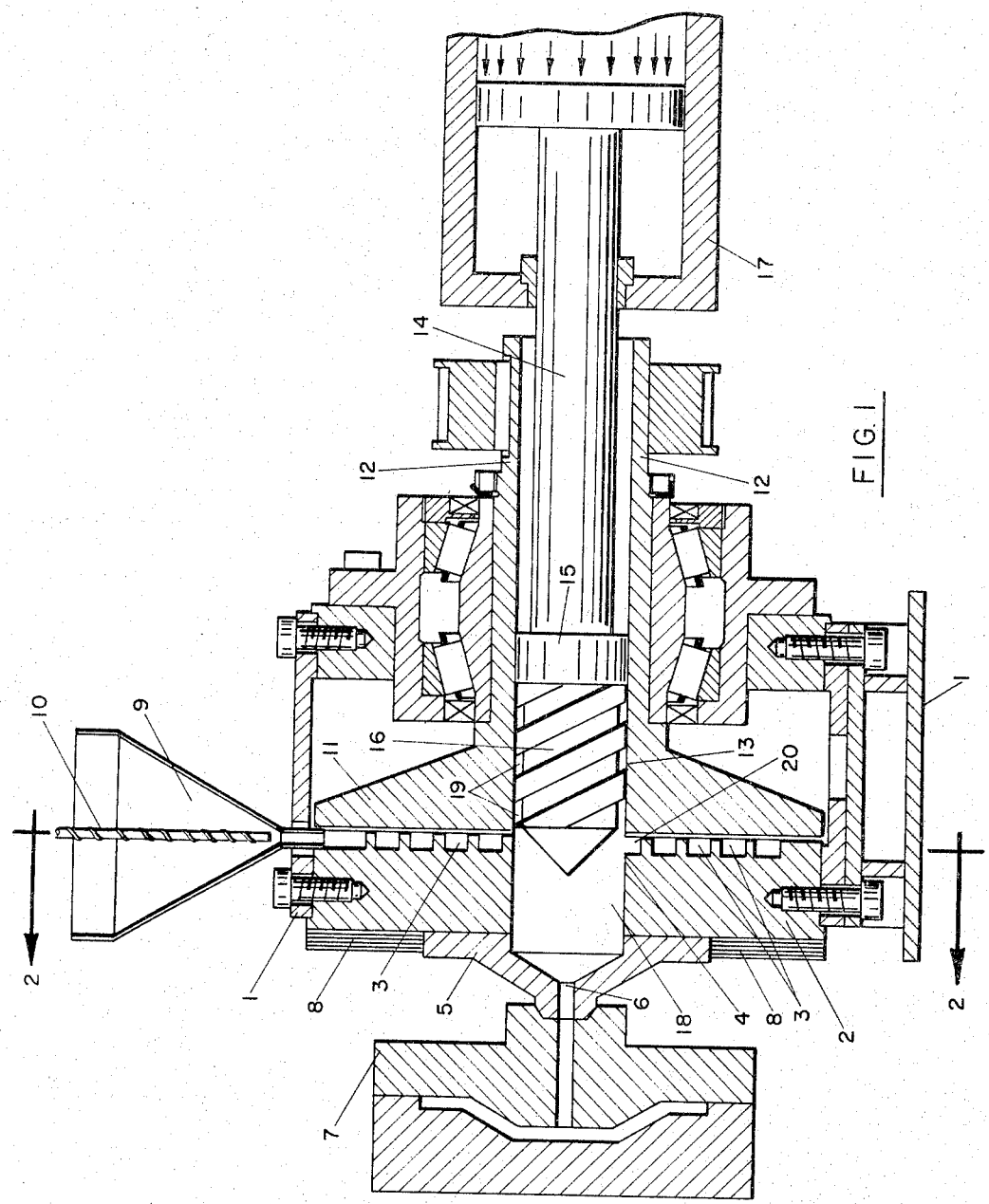
Figure 2:
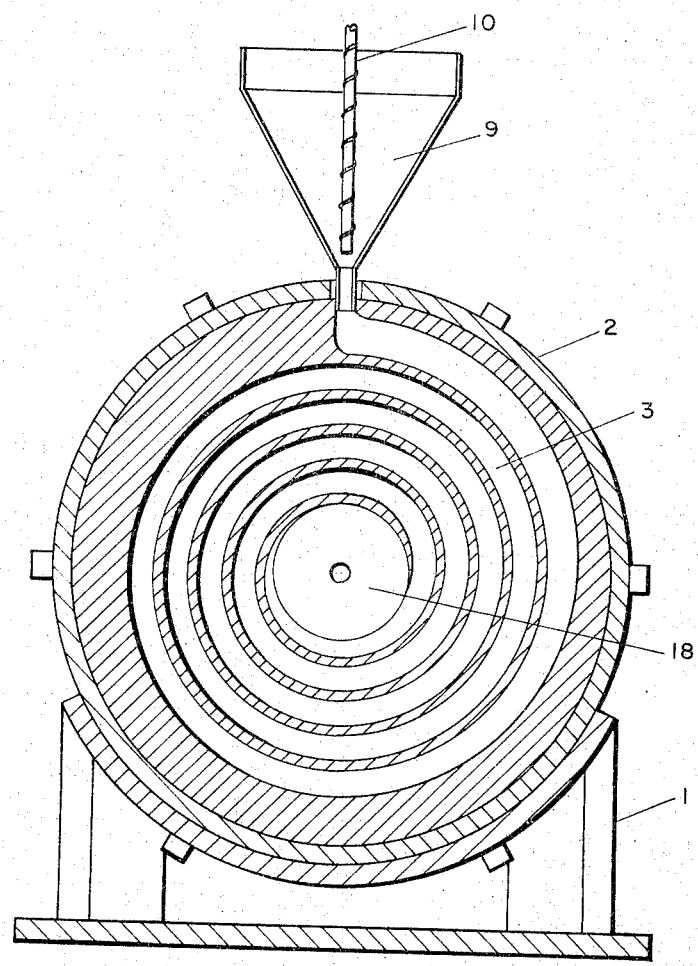

The novel injection molding machine of this invention is shown in the accompanying drawing in which:

FIG. 1 is a section view of the injection molding apparatus, and FIG. 2 is a view along section 2—2 of FIG. 1.

Referring to FIGS. 1 and 2, the injection molding apparatus of this invention comprises a support frame 1, a stationary plate 2 mounted therein having a polymer transfer channel 3 in the shape of an involute spiral on one surface thereof and a bore 4 through its geometric center. Associated with the stationary plate is sprue bushing 5 having sprue orifice 6 communicating with the center bore 4 of said plate on one side and with the mold form 7 on the other side. Optionally, heating means 8 are provided for heating said stationary plate. A polymer feed hopper 9 containing a feed screw 10 is provided to feed solid ploymer into the polymer transfer channel 3. Journaled in the support frame is a rotatable plate 11 having an elongated drive shaft 12 extending from one surface thereof, and a bore 13 through the geometric center of the plate and the shaft. Rotatable plate 11 is of substantially the same diameter as is stationary plate 2 and is mounted in extremely close proximity thereto, whereby the center bores 4 and 13 in the two plates are collinear and form a channel extending through the machine. Disposed in the collinear center bores is a reciprocable injection ram 14, having a piston 15 and a lead section 16 adapted to receive and contain a small quantity of molten polymer. Means 17 is provided for reciprocating the injection ram.

The operation of the novel injection molding apparatus of this invention commences with the injection ram 14 in its most rearward position as shown in FIG. 1. With the ram in this position, a portion of the channel formed by the collinear center bores 4 and 13 of the stationary plate 2 and the rotatable plate 11 is left unoccupied to form a reservoir, designated generally at 18, to accumulate sufficient polymer for each injection charge.

In operation, thermoplastic molding powder is fed from feed hopper 9 into the polymer transfer channel 3 and therein raised to a temperature sufficient to melt the polymer. Depending upon the bulk density and physical state of the polymer powder being fed, it is sometimes desirable to provide a positive feed of powder to the channel. When desired, this can be effected by feed screw 10.

The heating is preferably accomplished by extraneous heating means such as heaters 8 adapted to heat the stationary plate 2 either by electricity or by means of a heat transfer fluid. Alternatively, in some cases, heating can be accomplished autogenously by means of friction as the polymer is advanced along the feed channel.

The action of the rotating plate 11, rotating in extremely close proximity to the stationary plate 2, moves the polymer along polymer delivery channel 3 and delivers the same in totally molten state to the polymer reservoir 18 through opening 20. When sufficient polymer to form the desired injection charge has accumulated in the reservoir, the injection ram 14 is impelled forward and injects the molten polymer from the reservoir 18 through sprue orifice 6, into mold form 7. When all of the polymer from the reservoir has been injected into the mold form, the injection ram is immediately withdrawn to its most rearward position where it again comes to rest until the polymer reservoir is refilled, whereupon the cycle is repeated.

The movement of the injection ram is synchronized with the delivery of the polymer melt to the reservoir.

for example, the apparatus can be set up to operate upon a time cycle, based upon a predetermined rate of delivery of molten polymer to the reservoir. Alternatively, the cycle can be based upon the level or mass of polymer in the reservoir. In any case, when the preselected condition for actuating the ram is satisfied, a signal is generated, the ram is impelled forward, and the injection cycle is accomplished.

The force for impelling the injection ram can be supplied by any convenient means. A hydraulic cylinder is a very convenient and very popular such means. An electric motor is also very convenient. In some cases a properly designed cam gear synchronized with the rotation of the flat plate can be employed.

As the injection ram 14 is advanced into its forward position to accomplish the injection of the molten polymer into the mold form, it blocks the opening 29 by which the polymer delivery channel 3 communicates with the molten polymer reservoir 18. Since the pumping action of the rotating plate against the grooved plate is essentially a positive displacement action, an undesirable pressure will quickly build up in the polymer delivery channel if this opening is completely blocked. In order to relieve this situation, the leading section 16 of the ram, ahead of the piston 15 is adapted to receive a small amount of polymer during the time the ram is in the forward position. In the embodiment shown in FIG. 1, the lead section 16 of the ram is threaded to resemble an ordinary extrusion screw, the threads defining a helical channel 19 between the ram and the interior surface of hollow drive shaft 12. As the ram is in its forward position, the polymer being fed by the extruder is discharged into these threads. The channel is sized so as to be able to receive all the material necessary to complete a given time cycle. When the ram is reciprocated, following the injection step, the material in the channel is drawn back therewith. While the ram is at rest during the refilling of the reservoir, the rotating plate is constantly in motion so that the interior surface of its hollow drive shaft, rotating in close proximity to the threaded section of the ram, impels the polymer in the channel forward into the polymer reservoir, thereby emptying the channel and providing space for discharge of polymer during the next succeeding injection cycle.

The threaded lead section of the ram is not the only means for prevention of pressure build-up during the forward travel of the injection ram. It is also possible to accomplish this objective by merely undercutting the lead end of the ram very slightly, though this type of channel does not discharge the molten polymer so efficiently after the ram has been withdrawn to the rearward, rest position. It can also be accomplished by provision of appropriate synchronizing means whereby the rotation of the flat plate is momentarily discontinued during this time period.

The concept of the involute spiral extruder comprising a stationary grooved plate and a rotating flat plate as employed in the injection molding apparatus of this invention is described more fully in copending U.S. application Ser. No. 345,997, filed Feb. 19, 1964. This extruder is a distinct advantage over the standard helical screw extruders which have been employed in the past for plasticating the molding polymer and supplying the same to the injection ram. One very significant advantage is its greatly reduced size, as mentioned previously. Normally, in order to effect proper plasticating and mixing of the polymer, a helical screw would be required to be about 4 to 10 feet in length. By forming the screw as an involute spiral, this length is greatly decreased. Another advantage of the involute screw is that it affords much better mixing of the polymer with additives, such as stabilizers and pigments, which might be added thereto. The better mixing results from the design of the involute signal spiral which permits a greater amount of back flow within the channel than does that of the conventional helical screw.

What I claim and desire to protect by Letters Patent is:
1. A molding machine comprising a frame,
   a stationary plate mounted on said frame and having an axial bore and an extruder face substantially normal to the axis thereof,
   a sprue orifice collinearly of and in communication with the axial bore of said stationary plate,
   a rotatable plate having having an elongated shaft and an extruder face substantially normal to the axis thereof, said elongated shaft extending axially from said rotatable plate in the direction opposite from said extruder face and having an axial bore the diameter of the leading end of which is substantially equal to the axial bore of said stationary plate,
   means for mounting said rotatable plate on said frame collinearly of said stationary plate for rotation and with the extruder face thereof in close proximity to the extruder faces of said stationary plate whereby relative rotation of said extruder faces will force molten polymer into the axial bore of said rotatable plate,
   an injection ram having a leading end fitting the axial bores of said stationary and rotatable plates with a close tolerancy, said injection ram being mounted in the axial bore of said rotatable plate for movement endwise thereof to advance the leading end of said ram into and to retract the same from the axial bore of said stationary plate and thereby to force molten polymer from said bore out said sprue orifice and to provide for the accumulation in said bore of molten polymer delivered thereto by said extruder faces,
   means for rotating said rotatable plate,
   means for imparting endwise movement to said ram,
   and means at the leading end of said ram for receiving molten polymer from said polymer outlet when said ram is advanced into the axial bore of said stationary plate and for discharging the molten polymer when said ram is retracted into the axial bore of said rotatable plate.
2. A molding machine in accordance with claim 1 in which said last mentioned means comprises an extruder screw on said ram at the leading end thereof, said screw cooperating with the axial bore of the rotatable plate when said ram is retracted whereby relative rotation between said ram and said rotatable plate forces polymer toward the leading end of said ram and into the axial bore of said stationary plate.
3. A molding machine in accordance with claim 1 in which the extruder face of said stationary plate comprises an involute spiral groove and the extruder face of said rotatable plate is substantially planar.
4. A molding machine in accordance with claim 1 in which said sprue orifice comprises the input of an injection mold.

References Cited

UNITED STATES PATENTS

| | | | |
|---|---|---|---|
| 3,032,814 | 5/1962 | Miner | 18—12 |
| 3,068,517 | 12/1962 | Blackmore | 18—12 X |
| 3,178,769 | 4/1965 | Lorenian | 18—30 |
| 3,248,755 | 5/1966 | Plymale | 18—12 |
| 3,262,154 | 7/1966 | Valyi | 18—12 |

FOREIGN PATENTS

| | | |
|---|---|---|
| 1,262,650 | 4/1961 | France. |

WILLIAM J. STEPHENSON, *Primary Examiner.*

UNITED STATES PATENT OFFICE
CERTIFICATE OF CORRECTION

Patent No. 3,355,764            December 5, 1967

Richard L. Moyer

It is hereby certified that error appears in the above numbered patent requiring correction and that the said Letters Patent should read as corrected below.

Column 2, line 20, for "ploymer" read -- polymer --; column 4, line 3, strike out "signal"; line 13, strike out "having", second occurrence.

Signed and sealed this 7th day of January 1969.

(SEAL)
Attest:

Edward M. Fletcher, Jr.

Attesting Officer

EDWARD J. BRENNER

Commissioner of Patents